P. CHOVANECZ.
EXPANSIBLE HORSESHOE.
APPLICATION FILED APR. 30, 1915.

1,147,927.

Patented July 27, 1915.
2 SHEETS—SHEET 1.

Inventor
P. Chovanecz

By A. W. Wilson
Attorney

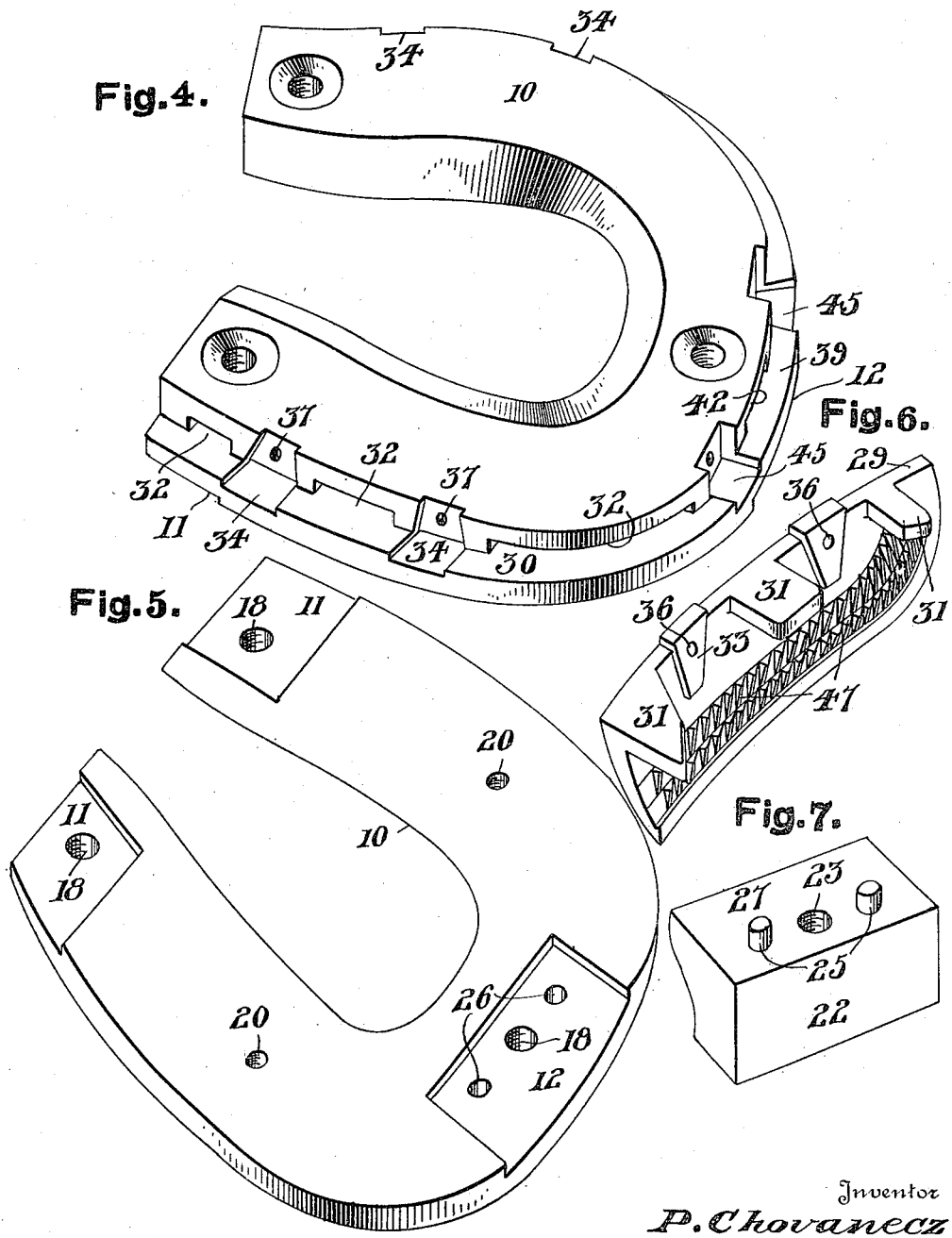

UNITED STATES PATENT OFFICE.

PAUL CHOVANECZ, OF JOHNSTOWN, PENNSYLVANIA.

EXPANSIBLE HORSESHOE.

1,147,927.  Specification of Letters Patent. Patented July 27, 1915.

Application filed April 30, 1915. Serial No. 25,007.

*To all whom it may concern:*

Be it known that I, PAUL CHOVANECZ, a citizen of the United States of America, residing at Johnstown, in the county of Cambria and State of Pennsylvania, have invented certain new and useful Improvements in Expansible Horseshoes, of which the following is a specification.

This invention relates to new and useful improvements in expansible horse shoes.

The primary object of the invention is to provide a horse shoe adapted for employment upon the hoof of a colt and capable of being expanded as the hoof increases in size by growth so that the same set of shoes may remain upon the colt until the hoof reaches its full size and development.

A further object of the invention is to provide a horse shoe having removable calk members upon the tread surface thereof and with expansible hoof engaging retaining flanges upon its opposite face, the shoe being also adapted for adjustment thereby accommodating itself to hoofs of different sizes.

A still further object of the invention is to provide a removably calked shoe plate with adjustable hoof clamping means whereby the shoe may be firmly mounted upon a hoof without the use of nails or other attaching means.

With these general objects in view and others that will appear as the nature of the invention is better understood, the same consists in the novel combination and arrangement of parts hereinafter fully described, illustrated in the accompanying drawings and pointed out in the appended claims.

Figure 1:
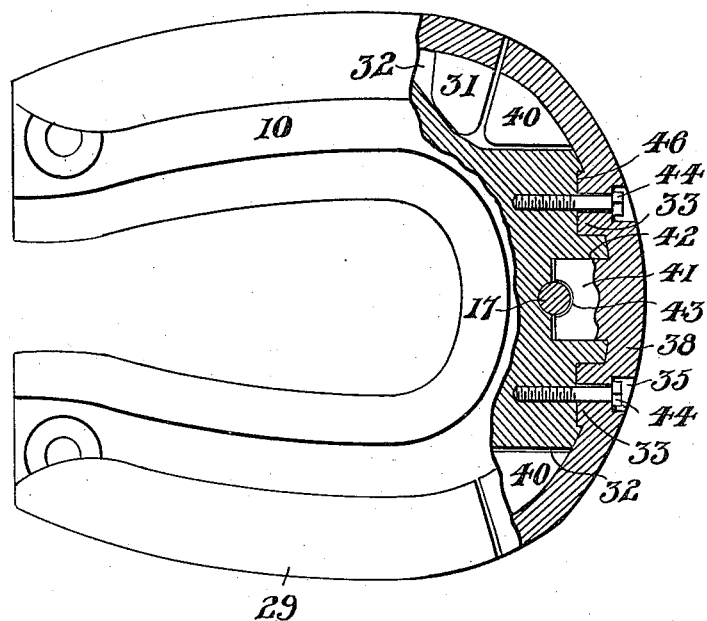
Figure 2:
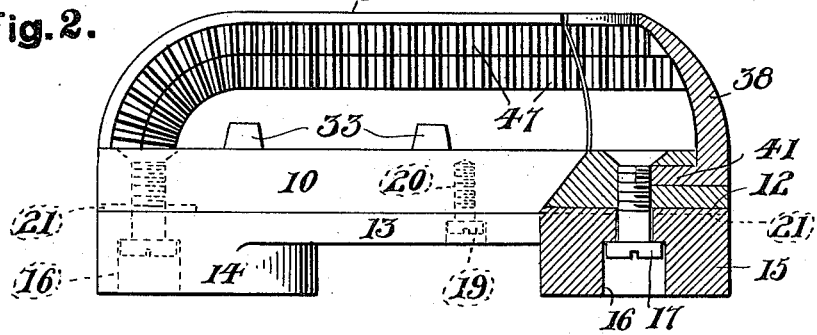
Figure 3:
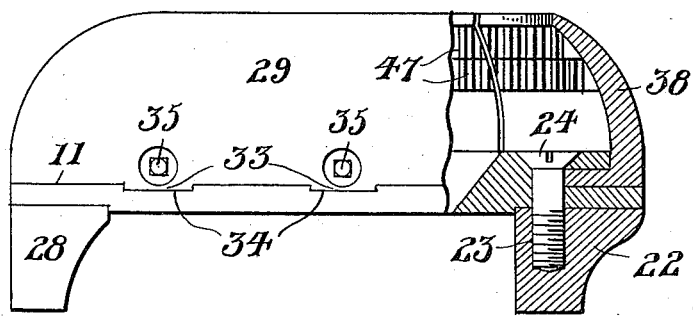

In the drawings forming a part of this application and in which like designating characters refer to corresponding parts throughout the several views:—Figure 1 is a top plan view of the shoe partially broken away. Fig. 2 is a central longitudinal sectional view thereof illustrated with the calk plate in position. Fig. 3 is a side elevation of the device partially broken away and with the individual calks mounted thereon. Fig. 4 is a perspective view of the base or shoe plate showing the upper side thereof. Fig. 5 is an inverted perspective view of the said plate. Fig. 6 is a perspective view of one of the side clamping members detached, and Fig. 7 is a perspective view of the removable heel calk detached.

Referring more in detail to the drawings, it will be noted that a foundation or base plate 10 is employed being of the usual horse shoe shape and being provided with calk receiving heel sockets 11 and a similar toe socket 12 in the lower face thereof. A calk plate 13 is provided for use upon the base plate 10 during ordinary conditions such as in summer weather, the said plate 13 having integral heel calks 14 and a toe calk 15. Each of the said calks 14 and 15 is provided with a similar socket 16 extending inwardly from the tread surface thereof and adapted for the reception of a screw 17 passing through the plate 13 and engaging within threaded openings 18 of the base plate 10, while smaller screws 19 are also employed extending through the plate 13 and engaging within threaded sockets 20 of the said plate 10, all as best illustrated in Fig. 2. The said plate 13 is provided with projections 21 at the heel and toe portions thereof for reception within the aforementioned sockets 11 and 12 of the base plate 10.

For winter use separate toe and heel calks are employed, the heel calk 22 being of the form best illustrated in Fig. 7 and having a threaded socket 23 in its upper face adapted for the reception of a mounting screw 24 extending through the toe perforation 18 of the base plate 10, as best illustrated in Fig. 3 of the drawings, while projecting studs 25 carried by the toe calk 22 fit within the recesses 26 formed in the plate 10, it being understood that the engaging face 27 of the toe calk fits within the toe socket 12 of the base plate 10. Heel calks 28 are adapted to be secured in a similar manner fitting within the heel sockets 11 of the base plate 10 and provided with securing screws (not shown) which engage the perforations 18 of the plate.

Oppositely arranged side clamping flanges 29 are removably and adjustably seated upon a marginal flange 30 of the base plate 10 and have inwardly projecting arms 31 which are slidably received within recesses 32 of the base plate. Lugs 33 are carried by the flanges 29 and are adapted to slide within the angular notches 34 of the base plate. Adjusting screws 35 are journaled through openings 36 of the lugs 33 and have threaded engagement with sockets 37 in the adjacent edge of the base plate and within the margin of the aforementioned notches 34. A toe flange 38 is similarly formed for seating upon the toe portion 39 of the base plate flange 30, the same being provided with projecting arms 40 positioned within the forwardly arranged ones of the aforementioned recesses 32. A central arm 41 carried by the toe flange 38 is slidably arranged within a similar toe recess 42, the said arm 41 having a curved notch 43 upon its free end for accommodating the securing screw of the calk member that is employed with the plate. Adjusting screws 44 are likewise carried by the toe flange 38 and engage the base plate 10 within toe notches 45 thereof, while lugs 46 of the toe flange are slidably mounted within the said notches.

With this detailed description of the device, it will be readily seen that the calk plate 13 may be employed when desired while by removing the retaining screws 17 and 19 the calk plate may be detached, thus allowing the proper positioning of the calks 22 and 28 by means of the screws 24 whenever found desirable such as in the winter time for use upon snow and ice. The adjusting screws 35 and 44 being released, the shoe is readily positioned upon the bottom of the horse's hoof whereupon the said screws 35 and 44 may be tightened to draw the inwardly projecting teeth 47 of the said flanges forcibly against the outer inclined face of the hoof and whereby the shoe is firmly seated for use upon the horse's hoof. In employing the same for use upon a growing colt, it will be seen as the hoof increases in size, the screws 44 may be slightly released and thus accommodating the shoe to the increase in size of the hoof and this operation may continue until the hoof reaches its normal size and at which time the shoe may then be used as a removable horse shoe whenever desired. This structure of shoe is therefore adaptable for summer and winter use and is adjustable for different sized hoofs as well as during use upon a growing hoof.

While the form of the invention herein shown and described is what is believed to be the preferred embodiment thereof, it is nevertheless to be understood that minor changes may be made in the form, proportion and details of construction without departing from the spirit and scope of the invention as set forth in the appended claims.

What I claim as new is:—

1. A shoe comprising a horse shoe shaped base plate having a marginal flange and a plurality of side recesses in the inner edge of the said flange, and intermediately arranged angular notches in the said flange and plate, clamping flanges shiftably mounted upon the said plate flange and having inwardly extending arms within the said sockets and inwardly projecting lugs within the said notches and adjusting screws positioned through the said lugs in engagement with the said plate.

2. A shoe comprising an arch shaped plate having an outer marginal flange and provided with spaced sockets adjacent the inner edge of the said flange, the said flange and plate having angular notches therein, a toe and opposite side clamping flanges transversely shiftable upon the said plate flange and provided with triangular lugs slidably fitting the said notches, inwardly projecting arms carried by the said clamping flanges slidably mounted upon the said plate flange and extending within the said sockets, adjusting screws carried by the said plate and extending through the said flange lugs and hoof engaging teeth upon the inner faces of the said clamping flanges.

In testimony whereof I affix my signature.

PAUL CHOVANECZ.

Copies of this patent may be obtained for five cents each, by addressing the "Commissioner of Patents, Washington, D. C."